United States Patent
MacDonald et al.

(10) Patent No.: US 6,709,619 B2
(45) Date of Patent: Mar. 23, 2004

(54) DOUBLE-CAST SLUSH MOLDING METHOD

(75) Inventors: John MacDonald, Dover, NH (US); Michael Conroy, Barrington, NH (US); MaryLou Smith LeCoz, Cobourg (CA); Marvin Nelson, Baltimore (CA)

(73) Assignee: Textron Automotive Company Inc., Troy, MI (US)

( * ) Notice: Subject to any disclaimer, the term of this patent is extended or adjusted under 35 U.S.C. 154(b) by 94 days.

(21) Appl. No.: 10/138,630

(22) Filed: May 3, 2002

(65) Prior Publication Data

US 2003/0109601 A1 Jun. 12, 2003

Related U.S. Application Data

(62) Division of application No. 09/528,396, filed on Mar. 20, 2000, now Pat. No. 6,409,493.

(51) Int. Cl.[7] .............................................. B29C 41/18
(52) U.S. Cl. .................... 264/250; 264/255; 264/260; 264/294; 264/299; 264/302
(58) Field of Search ........................... 264/241, 250, 264/255, 259, 260, 267, 269, 294, 299, 302, 308

(56) References Cited

U.S. PATENT DOCUMENTS

| | | | |
|---|---|---|---|
| 4,217,325 A | 8/1980 | Colby | 264/245 |
| 4,331,626 A | 5/1982 | Colby | 264/310 |
| 4,389,177 A | 6/1983 | Colby | 425/144 |
| 4,562,025 A | 12/1985 | Gray | 264/126 |
| 4,722,678 A | 2/1988 | Wersosky | 425/145 |
| 4,740,337 A | 4/1988 | Gale et al. | 264/40 |
| 4,755,333 A | 7/1988 | Gray | 264/37 |
| 4,769,278 A | 9/1988 | Kamurura et al. | 428/282 |
| 4,783,302 A | 11/1988 | Kurimoto | 264/251 |
| 4,894,004 A | 1/1990 | Brault | 425/435 |
| 4,938,906 A | 7/1990 | Brault | 264/163 |
| 5,013,508 A | 5/1991 | Troester | 264/224 |
| 5,093,066 A | 3/1992 | Batchelder et al. | 425/130 |
| 5,316,715 A | 5/1994 | Gray | 425/120 |
| 5,344,183 A | 9/1994 | Hersman et al. | 280/728 |
| 5,580,501 A | * 12/1996 | Gallagher et al. | 264/45.3 |
| 5,676,381 A | 10/1997 | Buzzoni et al. | 425/130 |
| 5,840,236 A | * 11/1998 | Ngoc | 264/302 |
| 6,045,732 A | * 4/2000 | Nakatsuji et al. | 264/46.4 |

FOREIGN PATENT DOCUMENTS

| | | | |
|---|---|---|---|
| AT | 393990 | 1/1992 | B29B/7/74 |
| EP | 0367636 | 11/1989 | B29C/41/22 |
| GB | 2050921 | 1/1981 | B29C/5/04 |
| JP | 59156710 | 2/1983 | B29C/5/12 |
| WO | WO00/11065 | 3/2000 | C08J/3/22 |

* cited by examiner

*Primary Examiner*—Stephen J. Lechert, Jr.
(74) *Attorney, Agent, or Firm*—Grossman, Tucker, Perreault & Pfleger, PLLC

(57) ABSTRACT

An apparatus for slush molding a thin shell having an outer layer and an inner layer. The apparatus includes two tubs alternately movable to a cast position for dispensing their respective material contents into a mold cavity. According to another embodiment of the invention, the apparatus includes a diverter valve configured to alternately open a passage from each of two tubs to the mold cavity to selectively dispense charge materials from the respective tubs into the mold cavity. In addition, a method is provided for forming a thin shell having an outer layer and an inner layer. A first polymer material is cast and allowed to melt on a heated mold surface to form an outer layer. A second polymer material is then cast and allowed to melt and form an inner layer on the inner surface of the outer layer. The shell is then removed from the mold.

10 Claims, 7 Drawing Sheets

DOUBLE-CAST SLUSH MOLDING METHOD

This application is a divisional of Ser. No. 09/528,396, filed Mar. 20, 2000, now U.S. Pat. No. 6,409,493.

TECHNICAL FIELD OF THE INVENTION

This invention relates generally to a method and apparatus for slush molding a thin shell, and, more particularly, for slush molding a thin shell having an outer layer and an inner layer.

BACKGROUND OF THE INVENTION

The prior art includes a number of different methods for forming thin, resilient multi-layer trim component shells such as automotive instrument panel skins. It is often desirable, particularly in automotive interior trim applications, for the exterior "class A" surfaces of such shells to have an appealing appearance and feel to automobile passenger compartment occupants. To provide an aesthetically pleasing outer class A surface, at least the outer layer of such multi-layered shells is often formed by slush molding methods. Slush molding involves casting a charge of polymer material against a heated mold surface that is shaped to form the desired shape and texture of the outer surface of a thin shell to be cast within the mold. The casting may be accomplished by attaching and sealing an open upper end of a charge box to an outer rim of an open end of the mold. The charge box is then inverted to allow the polymer material within the charge box to fall by gravity from the charge box and onto the heated mold surface. Once polymer material is applied to the heated mold surface, the charge box returns to its upright position and excess casting material returns to the charge box. The cast material is then allowed to melt on the heated surface, the mold surface is cooled, and the material is allowed to harden before removing it from the mold surface. The thin shell layers may be cast in a hot air module using a dry blend, usually in the form of powder or microspheres, of polymer such as polyvinyl chloride (PVC). The dry blend may include material for imparting a predetermined color to the shell.

Current slush molding methods include a "double-cast" method that includes the casting of a first charge of polymer material on a heated mold surface as described above, then casting a second charge of polymer material on the inner surface of the layer formed by the first casting. Sufficient heat is transferred from the heated mold surface through the first layer to melt the second charge layer. The mold surface is then cooled to allow both layers to harden and bond to one another.

Double-cast slush molding processes are disclosed, for example, in U.S. Pat. No. 5,344,183, which issued Sep. 6, 1994 to Hersman et al.; U.S. Pat. No. 4,769,278, which issued Sep. 6, 1988 to Kamimura et al.; and U.S. Pat. No. 5,580,501, which issued Dec. 3, 1996 to Gallagher et al. Both Gallagher et al. and Kamimura et al. disclose the casting of a second charge comprising an expandable or foamable polymer powder. Hersman et al. disclose the casting of a second charge comprising reinforcing fibers impregnating a polymer material.

In addition, the assignee of the present invention has constructed and used a rotational apparatus for manufacturing thin walled hollow parts using a double-cast process. The apparatus is a modification of the apparatus disclosed in U.S. Pat. No. 4,722, 678 issued Feb. 2, 1988 to Wersosky and assigned to the assignee of the present invention. The apparatus includes a charge box supported on a movable cart that tracks with a guide mechanism. An electromechanical device shuttles the cart and charge box with the aid of the guide mechanism between a position directly below an open-ended mold for attachment to the mold and a position laterally displaced from the mold (i.e. perpendicular from the axis of rotation) for re-filling with polymer powder. The mold is mounted separately from the cart for rotation about trunnions on a support structure. The cart includes an elevator system that lifts the charge box into engagement with the open end of the mold when the cart is positioned below the mold. Once attached, the charge box is then inverted with the mold to a position over the mold to dispense its contents into the mold. The apparatus also includes a second cart and charge box that are sequentially shuttled into a position below the mold from a direction opposite the first cart and charge box and attached to the mold after the first charge box has been removed and displaced from the mold. From such equipment, two-layer slush molded shells have been manufactured from powdered polyvinyl chloride (PVC). The two-layer slush molded shells comprise a solid PVC outer layer and a foamed PVC inner layer made from virgin materials (i.e. has not been subjected to use other than required for its original manufacture). The materials further comprise the same PVC formulation with the same levels of ultraviolet stablization except that the PVC foam comprises a lower concentration of pigment resulting in a different color and a blowing agent to produce the foam, which makes the material unsuitable for use as the outer layer. The two layer slush molded shells further comprise an outer layer average thickness of 0.020 inches and an inner layer average thickness of 0.030 inches.

What is needed is an apparatus configured to execute a double cast slush molding method without the expense of multiple charge boxes and associated expense of added carts, rails and elevator systems. What is also needed is a method for slush molding a double-layer shell or skin using at least a proportion of less expensive materials without compromising the high-quality appearance of an outer class-A surface of the shell or skin.

SUMMARY OF THE INVENTION

In accordance with this invention, an apparatus for molding a thin shell having an outer layer and an inner layer is provided that includes at least two tubs configured to hold charge materials for delivery to a mold cavity. The tubs are simultaneously rotatable around a horizontal axis to an orientation where the charge materials will dispense from the tubs. The tubs have openings configured to be alternately blockable to allow the tubs to alternately dispense charge material into the mold cavity.

According to another aspect of the invention, the apparatus includes a support structure supported for rotation around a horizontal axis with at least two tubs supported on the support structure and configured to hold charge materials for delivery to a mold cavity. The tubs are rotatable with the support structure around the horizontal axis to an orientation where the charge materials will dispense from the tubs. The tubs are also alternately movable on the support structure to a dispensing position. The support structure is configured to block the opening of a tub not in the dispensing position and to unblock the opening of a tub in the dispensing position. This allows the tubs to alternately dispense their charge material into the mold cavity.

According to another aspect of the invention, the first one of the two tubs is movable between a first outer position and the dispensing position while the second one of the two tubs is movable between a second outer position and the dispensing position. The support structure is configured to block the tub opening of the first tub in the first outer position and block the tub opening of the second tub in the second outer position. The support structure is also configured to allow charge materials to flow from the tub in the dispensing position.

According to another aspect of the invention, a diverter valve connectable between the tubs and the mold cavity. The diverter valve is configured to alternately open a passage from each of the tubs to the mold cavity to allow charge materials from the respective tubs to be selectively dispensed into the mold cavity.

According to another aspect of the invention, the diverter valve includes a separator blade pivotally mounted within a chute that extends between the mold cavity and the two tubs. The separator blade is pivotally movable between a first position and a second position within the chute. In the first position the separator blade is positioned to admit the flow of material from the first tub through the chute and to block the flow of material from the second tub through the chute. In the second position the separator blade is positioned to admit the flow of material from the second tub through the chute and to block the flow of material from the first tub through the chute.

According to another aspect of the invention, a method for molding a thin shell having an outer layer and an inner layer is provided. The method includes providing a mold having a mold surface configured to complement the desired shape of the shell to be molded and heating the mold surface. A first polymer material is provided in a first tub having a first tub opening and a second polymer material is provided in a second tub having a second tub opening. The second tub opening is blocked and the tubs and the mold are tipped until at least a portion of the. first polymer material dispenses from the first tub onto the mold surface to form an outer layer. The tubs and the molds are then righted and the second tub opening is opened while the first tub opening is blocked. The tubs and the mold are then tipped until at least a portion of the second polymer material dispenses from the second tub onto at least a portion of the outer layer to form an inner layer. The mold surface is then cooled, the inner and outer layers are bond together and the shell is removed from the mold.

According to another aspect of the invention, the method for molding a thin shell having an outer layer and an inner layer including the step of providing a first polymer material in a first tub includes the steps of moving the first tub to a filling position on a support structure and filling the first tub with the first polymer material and the step of providing a second polymer material in a second tub includes the steps of moving the second tub to a filling position and filling the second tub with the second polymer material.

According to another aspect of the invention, the method for molding a thin shell having an outer layer and an inner layer including the steps of providing a first polymer material in a first tub and providing second polymer material in a second tub includes the steps of connecting the tubs to a diverter valve to provide a polymer material flow path from one of the tubs while blocking polymer material from flowing from the other of the tubs, operating the diverter valve to provide a flow path for the first polymer material from the first tub while blocking the flow of the second polymer material from the second tub and operating the diverter valve to provide a flow path for the second polymer material out of the second tub while blocking the flow of the first polymer material from the first tub.

According to another aspect of the invention, the method for molding a thin shell having an outer layer and an inner layer including the step of connecting the tubs to a diverter valve is preceded by an additional step of providing a diverter valve comprising a separator blade pivotally mounted within a chute. The chute is configured to releasably connect a mold cavity to the two tubs and to provide a polymer material flow path from the tubs to the mold cavity. The separator blade is pivotally movable between a first position and a second position within the chute. The separator blade in the first position admits the flow of material from the first tub through the chute and blocks the flow of material from the second tub through the chute. The separator blade in the second position admits the flow of material from the second tub through the chute and blocks the flow of material from the first tub through the chute.

According to another aspect of the invention, the method for molding a thin shell having an outer layer and an inner layer including the steps of operating the diverter valve to provide a flow path for the first polymer material includes the step of pivoting the separator blade to the first position, and the step of providing a layer of the second polymer material on the layer of the first polymer material by operating the diverter valve includes the step of pivoting the separator blade to the second position.

According to another aspect of the invention, a thin shell for an automotive trim panel having an outer layer and an inner layer is disclosed, where the outer layer comprises a first polymer material and an inner layer comprising a second polymer material. The inner layer at least partially covers the inner surface of the outer layer and is concealed from view by vehicle occupants.

According to another aspect of the invention, a thin shell for an automotive trim panel is disclosed, said shell having an outer layer and an inner layer, the shell comprising an outer layer comprising a first polymer material and an inner layer comprising a second polymer material, the second polymer material further comprising a polymer material at least a portion of which comprises a formed article prior to its use as the second polymer material, and the inner layer at least partially covering the inner surface of the outer layer and concealed from view by vehicle occupants.

According to another aspect of the invention, a thin shell for an automotive trim panel is disclosed, said shell having an outer layer and an inner layer, the shell comprising an outer layer comprising a first polymer material, an inner layer comprising a second polymer material, the second polymer material further comprising a mixture of two or more different polymer formulations, and the inner layer at least partially covering the inner surface of the outer layer and concealed from view by vehicle occupants.

According to another aspect of the invention, a thin shell for an automotive trim panel is disclosed, said shell having an outer layer and an inner layer, the shell comprising an outer layer comprising a first polymer material, an inner layer comprising a second polymer material, the second polymer material further comprising a polymer formulation which is more susceptible to ultraviolet degradation than the first polymer material, and the inner layer at least partially covering the inner surface of the outer layer and concealed from view by vehicle occupants.

According to another aspect of the invention, a thin shell for an automotive trim panel is disclosed having an outer layer and an inner layer wherein the outer layer comprises an average thickness in a range between and including 0.005 inches to 0.025 inches.

BRIEF DRAWING DESCRIPTION

To better understand and appreciate the invention, refer to the following detailed description in connection with the accompanying drawings.

DESCRIPTION OF THE INVENTION

A first embodiment of an apparatus 10 for slush molding a thin shell having an outer layer and an inner layer is generally shown at 10 in FIGS. 1–5. A second embodiment of the apparatus 10 is generally indicated at 10' in FIGS. 6–9. Reference numerals with the designation prime (') in FIGS. 6–9 indicate alternative configurations of elements that also appear in the first embodiment. Unless indicated otherwise, where a portion of the following description uses a reference numeral to refer to the figures, we intend that portion of the description to apply equally to elements designated by primed numerals in FIGS. 6–9.

Figure 1:
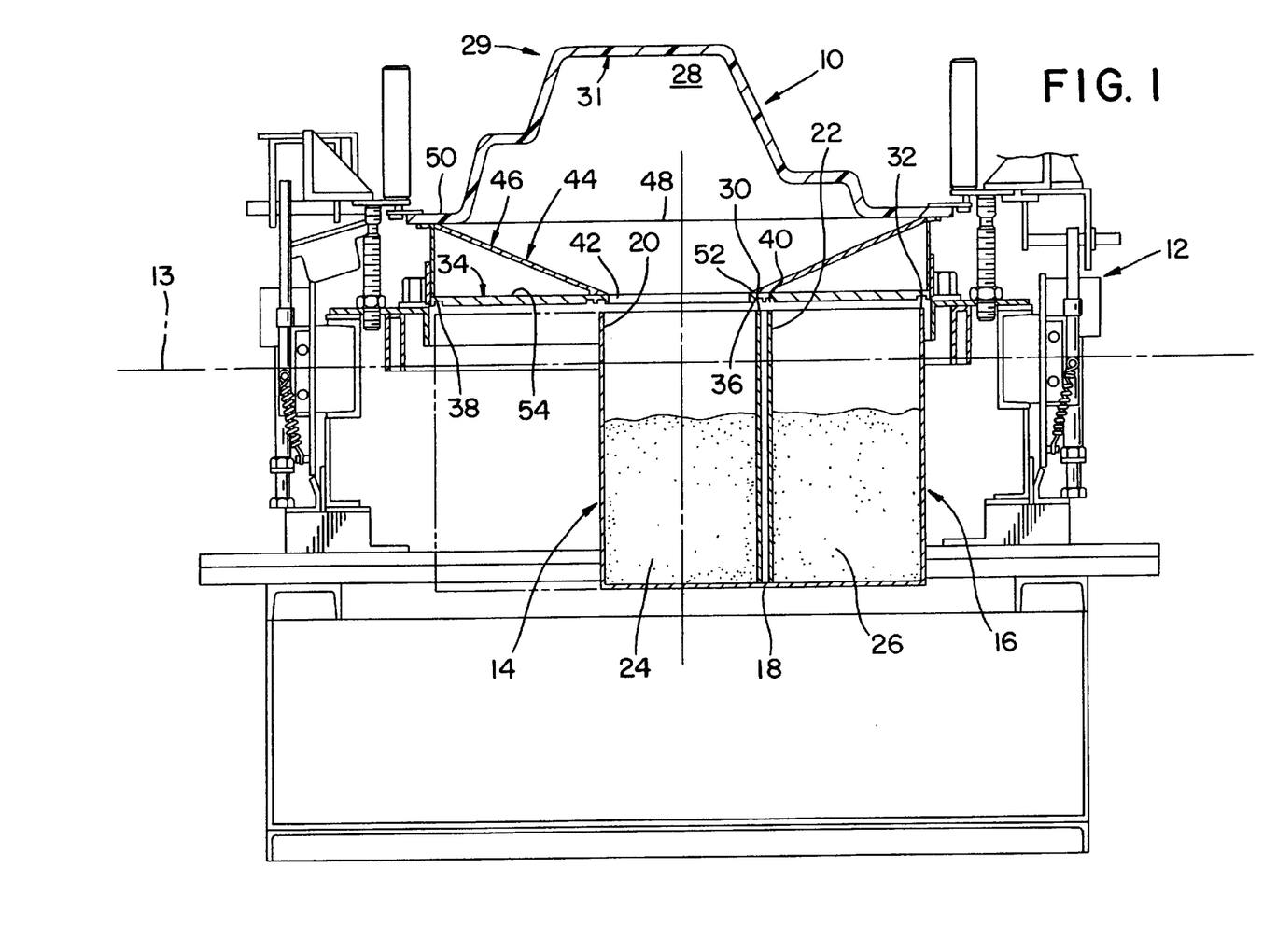
FIG. 1 is a partial cross-sectional front view of a slush molding apparatus constructed according to the present invention and showing two tubs in an upright position under the mold with a first of the two tubs disposed in the central unsealed position.

The apparatus 10 comprises a support structure generally indicated at 12 in FIGS. 1–5 and supported for rotation around a horizontal axis 13. The apparatus 10 also comprises at least two tubs shown at 14 and 16, respectively, in FIGS. 1–5. The tubs 14, 16 include respective tub openings shown at 20 and 22 in FIGS. 1–5. The tub openings 20, 22 are configured to dispense charge materials, such as the dry powdered polymer materials shown at 24 and 26 in FIGS. 1–5, from the respective tubs 14, 16 and are joined by a common tub base 18. The tubs 14, 16 are movably supported on the support structure 12. Each tub 14, 16 is configured to hold charge materials 24, 26 for delivery to a slush mold cavity 28 in a slush mold that is generally indicated at 29 in FIGS. 1–5. A first one of the two tubs 14, 16 is filled with a first polymer material 24 and is movable between a first outer position and a central cast position within the support structure 12. The first tub 14 is shown in the first outer position in FIGS. 4 and 5 and in the central cast position in FIGS. 1, 2 and 3. In FIG. 1 the first tub 14 is shown in a central position on the support structure 12 but is not fully in the cast position because it is not sealed against the support structure 12.

Figure 3:
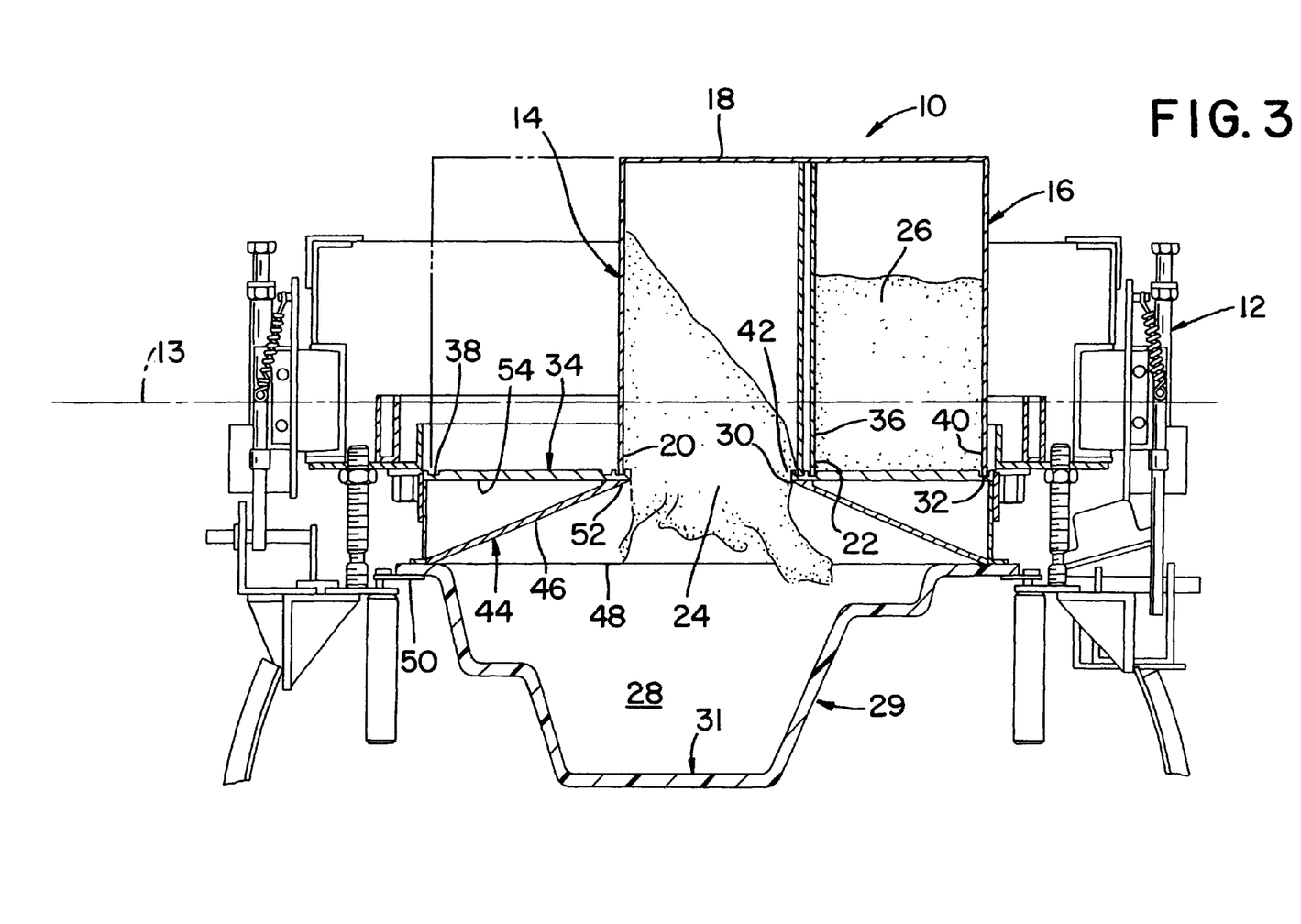
FIG. 3 is a partial cross-sectional front view of the slush molding apparatus of FIG. 1 showing the apparatus supporting the tubs in the inverted and sealed position over the mold with the first tub casting material into the mold from the central sealed cast position.
Figure 4:
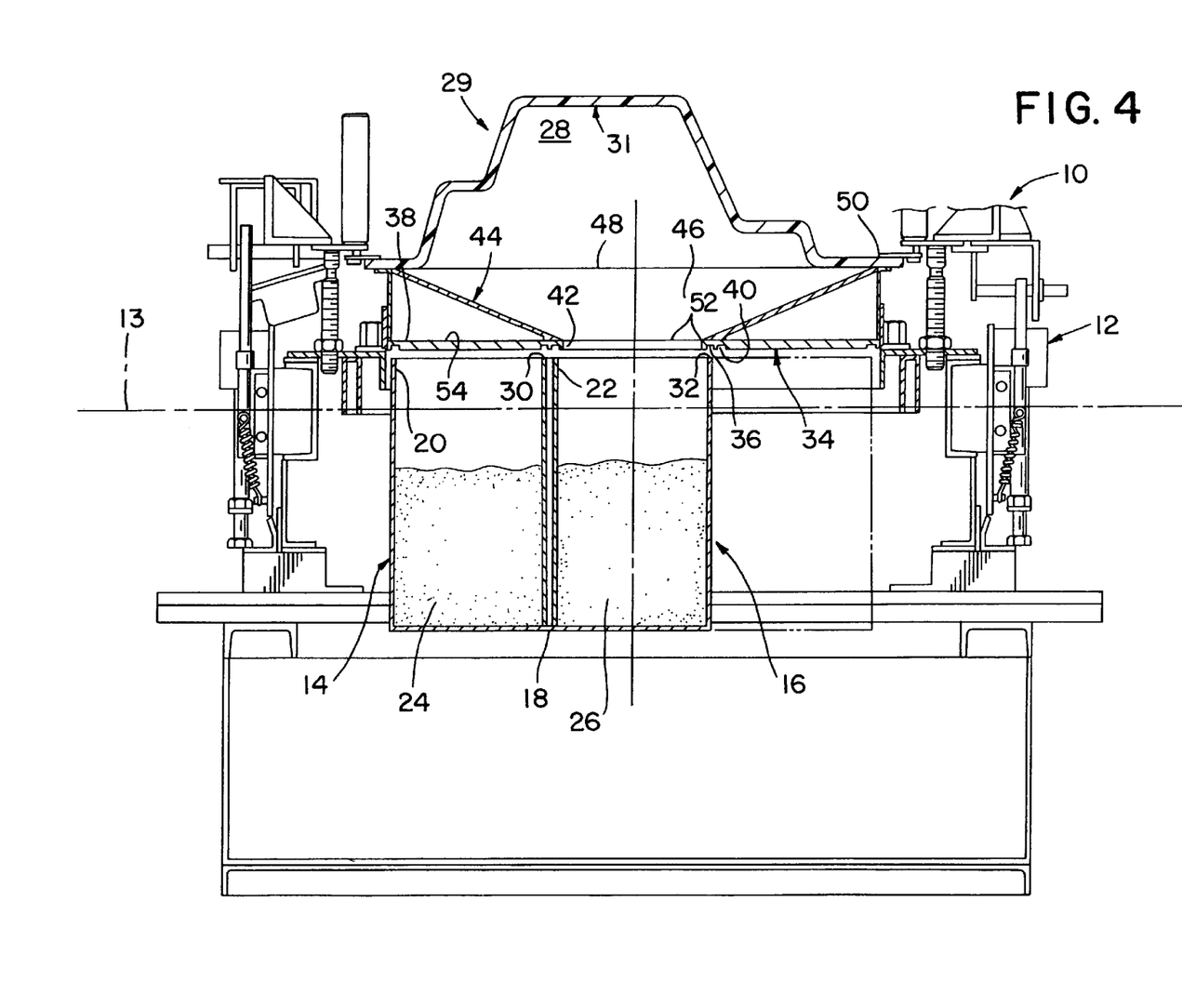
FIG. 4 is partial cross-sectional front view of the slush molding apparatus of FIG. 1 showing two tubs in an upright position under the mold with a second of the two tubs disposed in the central unsealed position.

A second one 16 of the two tubs 14, 16 is filled with a second polymer material 26 and is movable between a second outer position and the central cast position within the support structure 12. The second tub 16 is shown in the second outer position in FIGS. 1, 2 and 3 and in the central cast position in FIGS. 4 and 5. In FIG. 4 the second tub 16 is shown in a central position on the support structure 12 but is not fully in the cast position because it is not sealed against the support structure 12.

Figure 2:
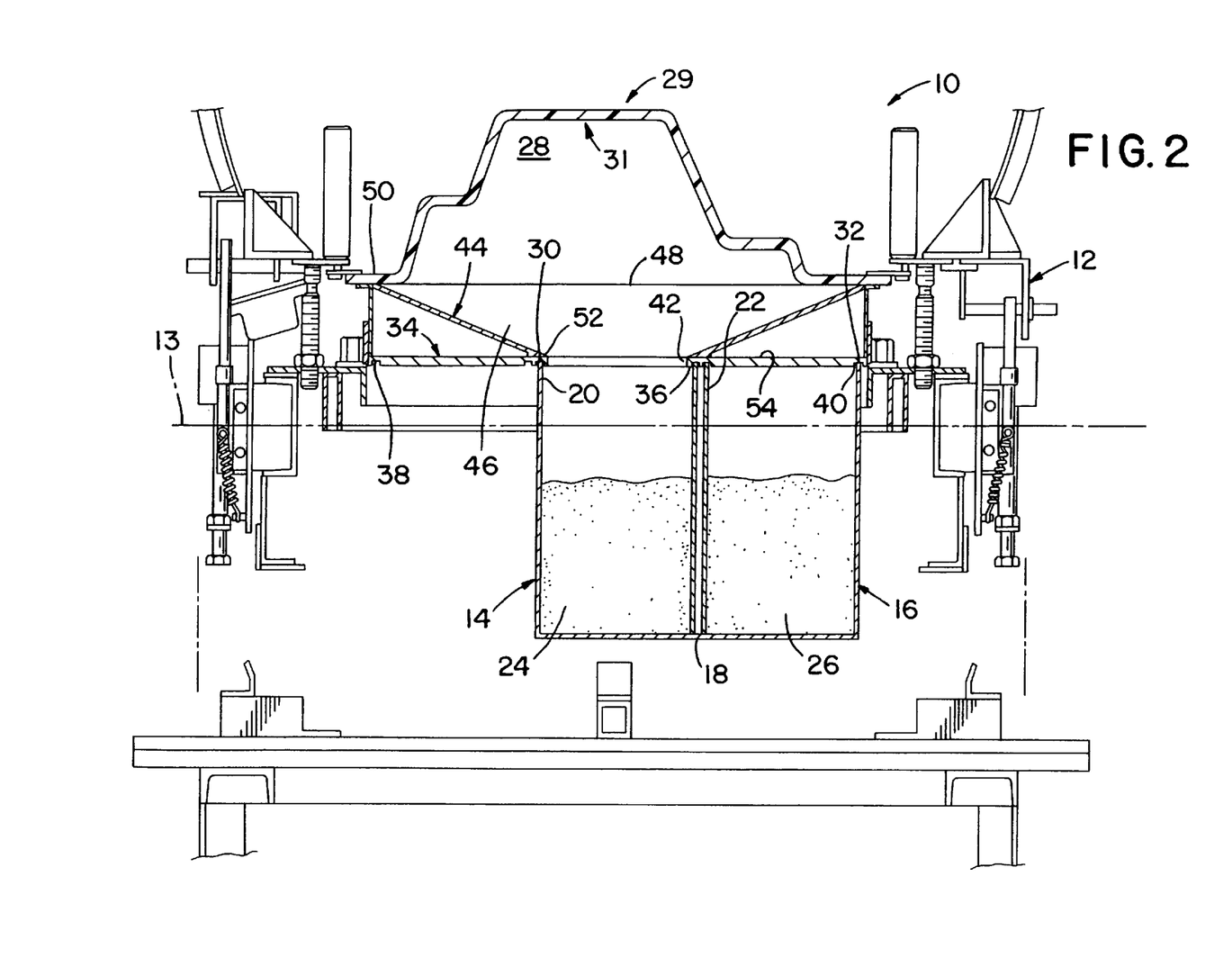
FIG. 2 is a partial cross-sectional front view of the slush molding apparatus of FIG. 1 showing the apparatus supporting the tubs in an upright and sealed position under the mold with the first tub disposed in a central sealed position.
Figure 5:
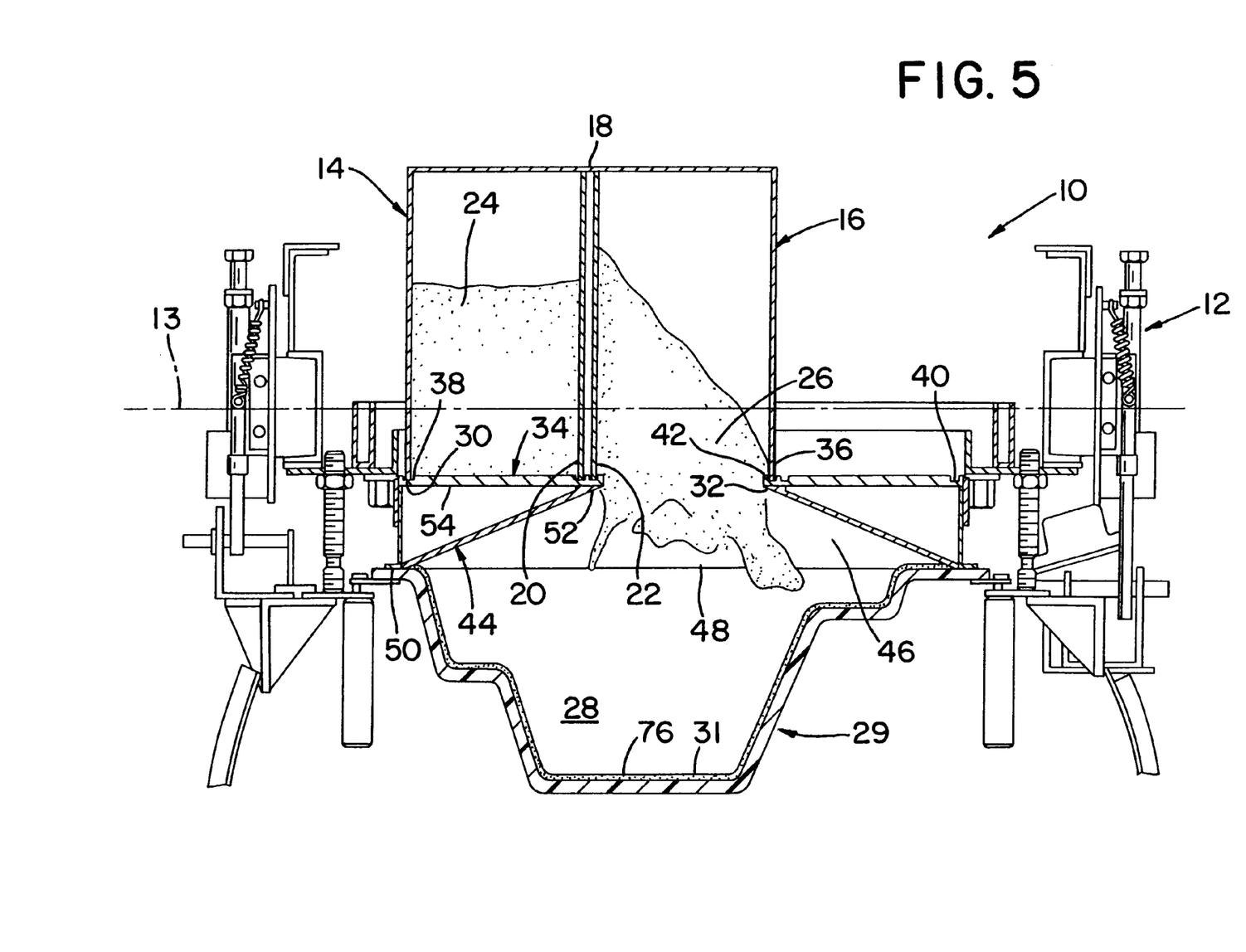
FIG. 5 is a partial cross-sectional front view of the slush molding apparatus of FIG. 4 showing the apparatus supporting the tubs in the inverted and sealed position over the mold with the second tub casting material into the mold from the central sealed cast position.

The two tubs 14, 16 are alternately movable to the central cast position for dispensing their respective polymer material contents 24, 26 into the mold cavity 28. Because the first and second tubs 14, 16 are connected together, they move together on the support structure 12. As shown in FIGS. 1, 2 and 3, when the first tub 14 is in the central position and the central cast position the second tub 16 is in the second outer position. As shown in FIGS. 4 and 5, when the second tub 16 is in the central and central cast positions the first tub 14 is in the first outer position. The tubs 14, 16 are rotatable with the support structure 12 around the horizontal axis 13 to an inverted cast orientation shown in FIGS. 3 and 5 in which the charge materials will dispense from the tubs 14, 16 by gravity when the tub openings 20, 22 are unblocked.

The support structure 12 is configured to block the tub opening 20 of the first tub 14 when the first tub 14 is in the first outer position and the second tub 16 is in the central cast position as shown in FIGS. 4 and 5. The support structure 12 is also configured to block the tub opening 22 of the second tub 16 when the second tub 16 is in the second outer position and the first tub 14 is in the central cast position as shown in FIGS. 1, 2 and 3. The support structure 12 is so configured to keep the charge materials 24, 26 contained in each tub 14, 16 from dispensing when the other tub 16, 14 is in the central position and in the inverted cast orientation. The support structure 12 is also configured to allow charge materials 24, 26 to flow from the tub opening 20, 22 of a tub 14, 16 in the central cast position. The support structure 12 is configured to unblock the tub opening 20, 22 of each tub 14, 16 in the central cast position to allow the tubs 14, 16 to alternately dispense the respective charge materials 24, 26 into the slush mold cavity 28.

Each tub 14, 16 includes a generally rectangular rim 30, 32 that defines the tub opening 20, 22 at the upper end of the each tub 14, 16. The support structure 12 includes an elongated rectangular sealing plate generally indicated at 34 in FIGS. 1–5. The sealing plate 34 has a central cast position sealing surface 36 disposed in a generally rectangular trough formed into the sealing plate 34. The support structure 12 also includes first and second outer position sealing surfaces 38, 40 disposed on opposite sides of the central cast position sealing surface 36. As with the central cast position sealing surface 36, the first and second outer position sealing surfaces 38, 40 are disposed in respective rectangular troughs formed into the sealing plate 34 of the support structure 12. Each of the three troughs has a generally rectangular shape configured to receive the rim 30, 32 of one of the tubs 14, 16 in sealing engagement. The central cast position sealing surface 36 is disposed around a generally rectangular aperture 42 formed in the sealing plate 34 to allow the passage of the polymer materials 24, 26 through the sealing plate 34 when the tub opening of one of the tubs 14, 16 is sealed to the sealing plate 34.

A hopper, generally indicated at 44 in FIGS. 1–5, is supported on the support structure 12 adjacent the cast position and is connected between the tubs 14, 16 and the mold cavity 28. The hopper 44 is defined by an outer wall 46 having the general shape of a hollow trapezoidal prism. The hopper 44 is disposed between the sealing plate 34 and the mold and is supported on the sealing plate 34. The hopper 44 has a relatively large generally rectangular upper opening 48 that is attached and sealed to a rectangular outer rim 50 of an open end of the mold 29. The hopper 44 has a relatively small generally rectangular lower opening 52 that is attached and sealed to an upper surface 54 of the sealing plate 34 around the sealing plate aperture 42.

The apparatus 10 is supported for rotation around the horizontal axis 13 to allow the tubs 14, 16, support structure 12 and an attached mold 29 to be inverted to cast the charge materials 24, 26 from one of the tubs 14, 16 into the mold 29, then to be returned to their original orientations for refilling of the tubs 14, 16 with additional quantities of the charge materials 24, 26 and is configured to prevent the charge materials 24, 26 from leaking out during a slush casting operation.

The two tubs 14, 16 may both be moved sequentially to the central cast position of the support structure 12 with both tub openings 20, 22 unblocked for refilling with respective charge materials (not shown). Alternatively, the two tubs 14, 16 may be moved together to meet at the central cast position before they are filled with the respective particulate polymer materials 24, 26. With both tubs 14, 16 disposed in the central cast position, the tubs 14, 16 may be simultaneously rather than sequentially refilled. More preferably, while in their upright and unsealed positions, the tub base 18 may be supported on a moveable cart that tracks with a guide mechanism. An electromechanical device may shuttle the cart and tub base 18 including tubs 14, 16 with the aid of the guide mechanism (e.g. track, rails) between a position directly below the open-ended mold for attachment to the mold and a position laterally displaced (i.e. perpendicular from the axis of rotation) from the mold for re-filling with polymer powder. The cart preferably includes an elevator system that lifts the tubs 14, 16 through tub base 18 into engagement with the open end of the mold when the cart is positioned below the mold.

Figure 6:
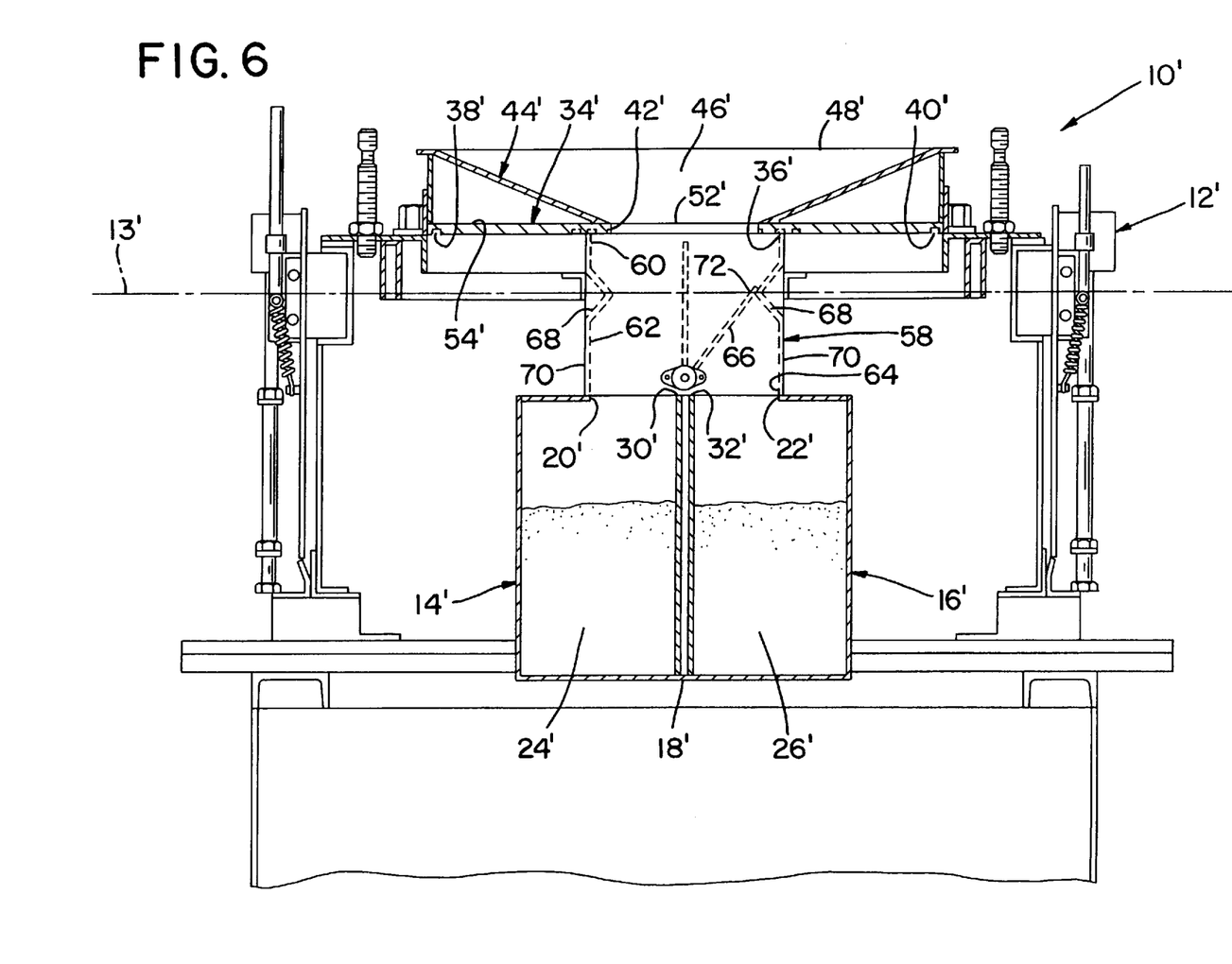
FIG. 6 is a partial cross-sectional front view of an alternative slush molding apparatus embodiment constructed according to the invention and showing two tubs supported in an upright position.
Figure 7:
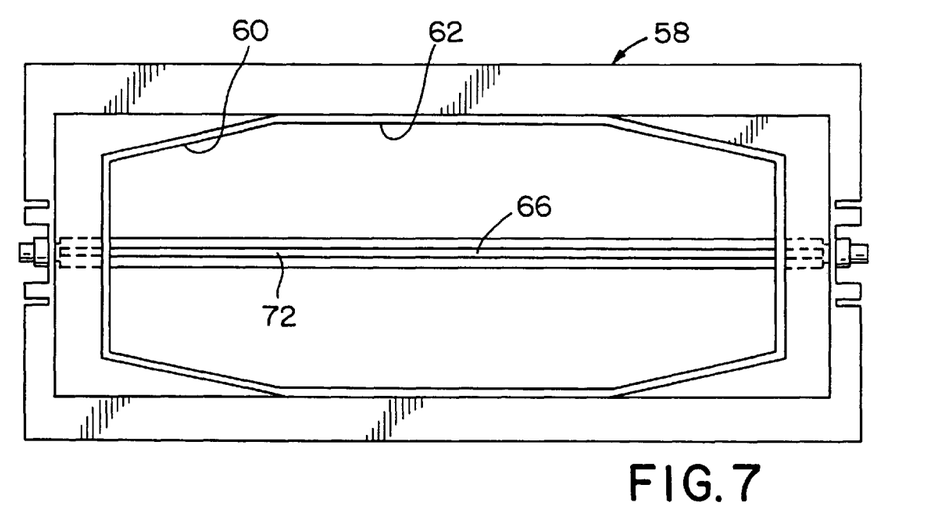
FIG. 7 is a top view of a chute of the alternative slush molding apparatus of FIG. 6.
Figure 8:
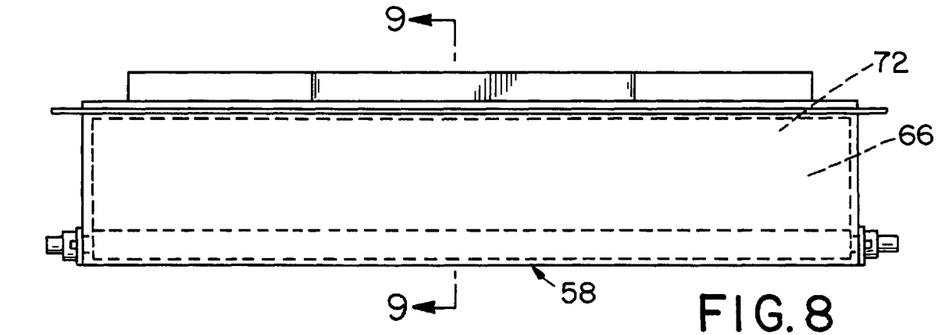
FIG. 8 is a side view of the chute of FIG. 7.
Figure 9:
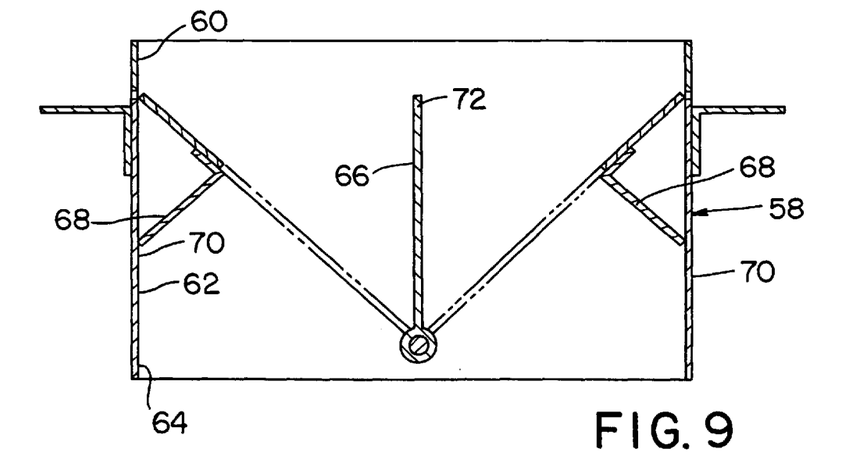
FIG. 9 is a cross-sectional front view of the chute of FIG. 8 taken along line 9—9 of FIG. 8 and showing a diverter valve disposed within the chute.

The slush mold apparatus 10' of the second embodiment comprises at least two tubs 14', 16' disposed in fixed positions adjacent one another as shown in FIG. 6. The apparatus 10' also includes a diverter valve generally indicated at 58 in FIGS. 6–9. The diverter valve 58 is connectable between the tubs 14', 16' and a mold cavity (not shown). More specifically, the diverter valve 58 is connectable between the lower opening 52' of the hopper 44' and the tub openings 20', 22'. An upper chute opening, shown at 60 in FIGS. 6, 7 and 9, is disposed at an upper end of a rectangular chute portion 62 of the diverter valve 58. The upper chute opening 60 is removably connected to the sealing plate 34' around the rectangular aperture 42' in the sealing plate 34'. The chute 62 also includes a lower chute opening shown at 64 in FIGS. 6 and 9. The lower chute opening 64 is configured to removably connect to the tubs 14', 16' by removably attaching to the sealing plate 34' around the sealing plate aperture 42'. While, in the embodiment of FIG. 6, the chute 62 does not physically contact the tub openings 20', 22', the chute 62 and tub openings 20', 22' are connected in the sense that they define a common flow path for the charge materials 24', 26' to pass through.

The diverter valve 58 is configured to alternately open a passage from each of the tubs 14', 16' to the mold cavity (not shown) to allow the charge materials 24', 26' from the respective tubs 14', 16' to be selectively casted into the mold cavity. In other words, the diverter valve 58 is configured to provide a polymer material flow path out of one of the tubs 14', 16' while blocking the polymer material 24', 26' from flowing out of the other of the tubs 14', 16'. More specifically, the diverter valve 58 is operable to provide a flow path for the first polymer material 24' out of the first tub 14' and through the chute 62 while blocking the second polymer material 26' from flowing out of the second tub 16'. Likewise, the diverter valve 58 is operable to provide a flow path for the second polymer material 26' out of the second tub 16' and through the chute 62 while blocking the first polymer material 24' from flowing out of the first tub 14'.

To accomplish this, the diverter valve 58 includes a separator blade shown at 66 in FIGS. 6–9. The separator blade 66 is pivotally mounted within the chute 62. The separator blade 66 is pivotally movable between a first position and a second position within the chute 62. In the first position, shown in FIG. 6, the separator blade 66 is positioned to admit the flow of material from the first tub 14' through the chute 62 and to block the flow of polymer material from the second tub 16' through the chute 62. In the second position (not shown) the separator blade 66 is positioned to admit the flow of material from the second tub 16' through the chute 62 and to block the flow of material from the first tub 14' through the chute 62. The diverter valve 58 includes first and second gussets shown at 68 in FIG. 9. the gussets 68 are fixed to respective chute sidewalls 70 and configured to support an outer edge 72 of the separator blade 66 in its respective first and second positions within the chute 62.

In practice, a thin shell having an outer layer and an inner layer may be formed by first providing a mold 29 with a mold surface 31 configured to complement the desired shape of the shell to be molded. The mold surface 31 is then heated and a first polymer material 24, preferably in the form of a dry particulate such as powder or microspheres, is cast onto the heated mold surface 31 as shown in FIG. 3. The first polymer material 24 is allowed to melt on the heated mold surface 31 and to form an outer layer 76 on the mold surface 31 as shown in FIG. 5. This layer 76 is termed the "outer" layer because it will, when installed, be the outer class-A surface of a trim panel, subject to the possible additional application of an outer coating (e.g. paint, clearcoat). A second polymer material 26, also preferably in the form of a dry particulate such as powder or microspheres, is cast on the outer layer 76 formed of the first polymer material 24 as shown in FIG. 5. The second polymer material 26 is allowed to melt and form an inner layer at least partially, and preferably completely, covering the inner surface of the outer layer 76 (not shown). Sufficient heat is transferred from the heated mold surface 31 through the outer layer 76 to melt the inner layer. The mold surface 31 is then cooled or allowed to cool which allows the inner and outer layers 76 to harden and bond together. Finally, the shell is removed from the mold 29.

This method may be implemented using a slush mold assembly 10, 10' constructed according to either the first or the second apparatus embodiments of the present invention described above. When an apparatus 10 constructed according to the first embodiment shown in FIGS. 1–5 is employed, the first polymer material 24 and the second polymer material 26 are cast by first moving the tubs 14, 16 to the central cast position on the support structure 12 or a position laterally displaced from the mold 29 and filling the tubs 14, 16 with the first and second polymer materials 24, 26, respectively, by pouring the first and second polymer materials 24, 26 into the open upper end of the hopper 44. The trapezoidal prism shape of the hopper 44 helps to guide the materials 24, 26 into their respective tubs 14, 16.

The first tub 14 is then connected to the mold by moving the first tub 14 laterally to the central cast position (i.e. parallel to the axis of rotation) on the support structure 12 as shown in FIG. 1. The first tub 14 is then moved upward until the rim 30 defining its upper opening 20 is in sealing contact with the central cast position sealing surface 36 on the sealing plate 34 as shown in FIG. 2. The upper opening 22 of the second tub 16 is blocked when the second tub 16 is moved upward against the sealing plate 34 along with the first tub 14. When the first tub 14 is sealed against sealing surface 36, the rim 32 defining the upper opening 22 of the second tub 16 seals against the second outer position sealing surface 40 of the sealing plate 34. The first and second tubs 14, 16 and the mold 29 are then inverted as shown in FIG. 3. When inverted, the first tub 14 is positioned over the mold 29 allowing the polymer material 24 within the first tub 14 to fall by gravity from the first tub 14, through the sealing plate aperture 42 and hopper 44 and onto the heated mold surface 31. The tubs 14, 16 and the mold 29 are then righted and the tubs 14, 16 are disconnected from the central cast position and second outer position sealing surfaces 36, 40 of the sealing plate 34, respectively. The rims 30, 32 defining the tub openings 20, 22 are moved downward out of sealing contact with the sealing plate 34. The tubs 14, 16 are then moved laterally, the first tub 14 out of the central cast position to the first outer position on the support structure 12, and the second tub 16 into the central cast position as shown in FIG. 4.

The second tub 16 is then connected to the mold by moving the tubs 14, 16 upward until the rim 32 defining the second tub opening 22 is in sealing contact with the central cast position sealing surface 36 of the sealing plate 34 and the first tub opening 20 is blocked by sealing the rim 30 of the first tub 14 against the first outer position sealing surface 38 of the support structure 12. The first and second tubs 14, 16 and the mold 29 are then inverted such that the second tub 16 is positioned over the mold 29 and the polymer material 26 within the second tub 16 is allowed to fall by gravity from the second tub 16, through the hopper 44, and onto the inner surface of the outer layer as shown in FIG. 5. The tubs 14, 16 and the mold 29 are then righted and the tubs 14, 16 are disconnected from the central cast position and first outer position sealing surfaces 36, 38 of the sealing plate 34, respectively. The rims 30, 32 defining the tub openings 20, 22 are moved downward out of sealing contact with the sealing plate 34.

In short, the two tubs 14, 16 are alternately shuttled into the central cast position of the support structure 12 for dispensing their respective material contents into a mold cavity 28.

The method of the present invention may also be implemented using a slush molding assembly constructed according to the second embodiment of the present invention shown in FIGS. 6–9. To cast the first and second polymer material 26' using an assembly of this type, the tubs 14', 16' are connected to the lower chute opening 64 of the chute portion 62 of the diverter valve 58 as shown in FIG. 6. As is also shown in FIG. 6, the separator blade 66 is moved to the first position opening a flow passage from the first tub 14' through the chute 62 and onto the mold surface 31' (not shown) and blocking the second tub 16'. The tubs 14', 16', diverter valve 58 and mold are then inverted causing the first polymer material 24' to flow through the flow passage and onto the heated mold surface 31'. The separator blade is then moved to the second position allowing the second polymer material 26' to flow through a flow passage from the second tub 16' through the chute 62 and onto the layer formed by the first polymer material 24'. In the second position, the separator blade also blocks the flow of any additional amount of the first polymer material 24' from the first tub 14'.

With regards to materials, the first and second polymer materials 24, 26 preferably comprise a thermoplastic such as polyvinyl chloride (PVC). Other first and second polymer materials 24, 26 may comprise, but are not limited to, thermoset polymers such as polyurethanes. Also, other first and second polymer materials 24, 26 may comprise, but are not limited to, thermoplastic polymers such as polyolefins (e.g. polypropylene, polyethyelene), thermoplastic polyurethanes, and polyesters. Still, other first and second polymer materials 24, 26 may comprise, but are not limited to, polymer groups such as thermoplastic olefins, thermoplastic elastomers, and thermoset elastomers. The first and/or second polymer materials 24, 26 also preferably comprise a material for imparting a predetermined color to the shell to be molded (e.g. pigment, dye).

In order to promote more efficient use of material with the two layer shell manufactured with the apparatus and method described herein, outer layer 76 preferably has an average thickness in a range between and including 0.005 inches to 0.025 inches and more preferably in the range and including 0.010 inches to 0.020 inches and even more preferably in the range between 0.012 inches and 0.018 inches. Furthermore, it should be understood that within the given ranges of thickness identified above, the ranges may be further narrowed by 0.001 inch increments. However, it has been found that as the average thickness of the shell decreases below 0.040 inches, removal from the mold surface 31 without permanent deformation of the shell is made more difficult.

While not being bound to a particular theory, a bond is created between the mold surface 31 and the shell upon casting. This bond must be overcome to remove the shell from the mold surface 31. Since the bond results from a surface phenomena (created between the mold surface 31 and the outer surface of the shell), the thickness of the shell is believed to be irrelevant as to the strength of the bond. In other words, the strength of the bond remains virtually constant for a given shell material and mold surface regardless of shell thickness. However, shell thickness plays an important role in removal of the shell from the mold surface. As the thickness of the shell increases it's tensile load increases and, correspondingly, the load for its elastic limit also increases. Thus, at an average thickness of 0.040 inches a single layer thermoplastic shell has been found to have a sufficient tensile load elastic limit to be removed from the shell mold surface 31 without, or negligible, permanent deformation. On occasion, an average shell thickness may drop to as low as 0.030 inches, but permanent deformation becomes more troublesome.

Given the above, while the inner layer preferably must contribute strength to the outer layer given the preferred thicknesses identified to facilitate shell removal from the mold surface 31, the invention recognizes that the inner layer need not necessarily contribute to the appearance of the outer layer given the inner layer is applied to the inner or "class B" surface of the outer layer 76 and thus concealed from view by vehicle occupants.

Thus, as a further feature of the invention, preferably the second polymer material 26 preferably comprises in a first alternative embodiment a polymer material a portion of which comprises a formed article prior to its use as the second polymer material 26.

By formed article, it is meant to include polymer material that has, e.g., experienced a prior plastics manufacturing operation, such as slush molding or injection molding, wherein the plastic material has been converted, by heat, or by heat and pressure, into some desired shape, but which has not survived a quality control measure, and has been rejected by the manufacture for commercial release. This would also include materials recovered in manufacture such as trim scrap and faulty parts (a/k/a/ regrind or recycle), and materials recovered from discarded post-consumer products (a/k/a/ reclaim). Formed article does not include virgin material (i.e., it has not been subjected to use other than required for its original manufacture).

In a second alternative embodiment the second polymer material may comprise a mixture of two or more different polymer formulations. By different polymer formulations it is meant that the two polymer formulations differ with respect to the polymer, or any additive contained within said polymer formulation. This alternative embodiment therefore may include virgin material. For example, this second alternative embodiment includes a polymer formulation of a first color mixed with a formulation of a second color. This would include, e.g., polymer formulations that cross-over or are commingled between tubs.

In a third alternative embodiment the second polymer formulation would include a polymer formulation (polymer plus additives) which is more susceptible to ultraviolet degradation than the polymer formulation used for the first polymer material 24. For example, in this third alternative embodiment, the second polymer formulation would include a formulation that has less UV stabilizer, or is a polymer formulation containing a polymer that itself is less UV stable. In addition, UV stability is conveniently and reliable measured by considering a change in either mechanical properties for a given exposure, and/or a change in average polymer molecular weight, such as the number average or weight average molecular weight.

Because we intend this description to illustrate certain embodiments of the invention rather than to limit the invention, we have used descriptive words rather than limiting words.

Obviously, it's possible to modify this invention from what the description teaches. Within the scope of the claims, one may practice the invention other than as described.

We claim:

1. A method for molding a thin shell having an outer layer and an inner layer, the method including the steps of:
   providing a mold having a mold surface configured to complement the desired shape of the shell to be molded;
   heating the mold surface;
   providing a first polymer material in a first tub having a first tub opening;
   providing a second polymer material in a second tub having a second tub opening;
   blocking the second tub opening;
   tipping the tubs and the mold until at least a portion of the first polymer material dispenses from the first tub onto the mold surface to form an outer layer;
   righting the tubs and the mold;
   opening the second tub opening;
   blocking the first tub opening;
   tipping the tubs and the mold until at least a portion of the second polymer material dispenses from the second tub onto at least a portion of the outer layer to form an inner layer;
   cooling the mold surface;
   allowing the inner and outer layers to bond together; and
   removing the shell from the mold.

2. A method as set forth claim 1 in which the steps of dispensing a first polymer material and dispensing a second polymer material each include the step of dispensing a polymer particulate.

3. A method as set forth in claim 2 in which the first or second polymer particulate comprises powder.

4. A method as set forth in claim 2 in which the first or second polymer particulate comprises microspheres.

5. A method as set forth in claim 1 in which the step of dispensing a first polymer material includes the step of dispensing a first polymer material including a material for imparting a predetermined color to the shell.

6. A method as set forth in claim 5 in which the step of dispensing a first polymer material including a material for imparting a predetermined color to the shell includes a pigment.

7. A method as set forth in claim 1 in which:
   the step of providing a first polymer material in a first tub includes the steps of moving the first tub to a filling position on a support structure and filling the first tub with the first polymer material; and
   the step of providing a second polymer material in a second tub includes the steps of moving the second tub to a filling position and filling the second tub with the second polymer material.

8. A method as set forth in claim 7 including the additional step of moving the two tubs together to meet at the filling position before the steps of providing the first and second polymer materials in the respective first and second tubs.

9. A method as set forth in claim 1 in which the steps of providing a first polymer material in a first tub and providing a second polymer material in a second tub includes the steps of:
   connecting the tubs to a diverter valve, the diverter valve configured to provide a polymer material flow path from one of the tubs while blocking polymer material from flowing from the other of the tubs;
   operating the diverter valve to provide a flow path for the first polymer material from the first tub while blocking the flow of the second polymer material from the second tub; and
   operating the diverter valve to provide a flow path for the second polymer material out of the second tub while blocking the flow of the first polymer material from the first tub.

10. A method as set forth in claim 9 in which:
    the step of connecting the tubs to a diverter valve is preceded by an additional step of providing a diverter valve comprising a separator blade pivotally mounted within a chute, the chute configured to releasably connect a mold cavity to the two tubs and to provide a polymer material flow path from the tubs to the mold cavity, the separator blade being pivotally movable between a first position and a second position within the chute, the separator blade in the first position admitting the flow of material from the first tub through the chute and blocking the flow of material from the second tub through the chute, the separator blade in the second position admitting the flow of material from the second tub through the chute and blocking the flow of material from the first tub through the chute;

the step of operating the diverter valve to provide a flow path for the first polymer material includes the step of pivoting the separator blade to the first position; and the step of providing a layer of the second polymer material on the layer of the first polymer material by operating the diverter valve includes the step of pivoting the separator blade to the second position.

* * * * *